(12) United States Patent
Shimomugi et al.

(10) Patent No.: US 9,847,735 B2
(45) Date of Patent: Dec. 19, 2017

(54) POWER CONVERSION DEVICE, MOTOR DRIVE CONTROL APPARATUS INCLUDING THE POWER CONVERSION DEVICE, AIR BLOWER AND COMPRESSOR INCLUDING THE MOTOR DRIVE CONTROL APPARATUS, AND AIR CONDITIONER INCLUDING THE AIR BLOWER OR THE COMPRESSOR

(71) Applicants: Takuya Shimomugi, Tokyo (JP); Michio Yamada, Tokyo (JP); Yosuke Shinomoto, Tokyo (JP); Mitsuo Kashima, Tokyo (JP); Shigeo Umehara, Tokyo (JP)

(72) Inventors: Takuya Shimomugi, Tokyo (JP); Michio Yamada, Tokyo (JP); Yosuke Shinomoto, Tokyo (JP); Mitsuo Kashima, Tokyo (JP); Shigeo Umehara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 567 days.

(21) Appl. No.: 14/395,101

(22) PCT Filed: Feb. 26, 2013

(86) PCT No.: PCT/JP2013/055011
§ 371 (c)(1),
(2) Date: Oct. 17, 2014

(87) PCT Pub. No.: WO2013/157303
PCT Pub. Date: Oct. 24, 2013

(65) Prior Publication Data
US 2015/0102759 A1   Apr. 16, 2015

(30) Foreign Application Priority Data
Apr. 20, 2012   (JP) .................... 2012-096897

(51) Int. Cl.
H02P 1/00   (2006.01)
H02M 7/06   (2006.01)
(Continued)

(52) U.S. Cl.
CPC ............... *H02M 7/06* (2013.01); *H02M 1/12* (2013.01); *H02M 1/4208* (2013.01);
(Continued)

(58) Field of Classification Search
CPC .. B60K 6/485; B60L 11/1887; B60L 2210/10; F02N 11/04
See application file for complete search history.

(56) References Cited

U.S. PATENT DOCUMENTS 4,748,397 A * 5/1988 Ogawa ................. H02M 3/142
323/222
8,564,992 B2   10/2013 Takahashi et al.
(Continued)

FOREIGN PATENT DOCUMENTS

JP   62-058871 A   3/1987
JP   2007-195282 A   8/2007
(Continued)

OTHER PUBLICATIONS

International Search Report of the International Searching Authority dated May 14, 2013 for the corresponding international application No. PCT/JP2013/055011 (and English translation).
(Continued)

*Primary Examiner* — Shawki S Ismail
*Assistant Examiner* — Zoheb Imtiaz
(74) *Attorney, Agent, or Firm* — Posz Law Group, PLC

(57) ABSTRACT

A power conversion device includes a switching control unit that controls respective switching elements constituting a plurality of chopper circuits, a rectified-voltage detection unit, a bus-bar voltage detection unit, and a bus-bar current
(Continued)

detection unit. The switching control unit includes an on-duty calculation unit that calculates a reference on-duty of respective drive pulses with respect to the switching elements based on a bus-bar voltage and a bus-bar current, an on-duty correction unit that corrects the reference on-duty to output on-duties of the respective drive pulses based on the bus-bar current, so that change amounts of respective reactor currents become substantially the same, and a drive-pulse generation unit that generates the respective drive pulses, based on the respective on-duties.

16 Claims, 8 Drawing Sheets

(51) Int. Cl.
    *H02M 1/42*         (2007.01)
    *H02M 3/158*       (2006.01)
    *H02M 1/12*         (2006.01)
    *H02P 23/28*        (2016.01)

(52) U.S. Cl.
    CPC ....... *H02M 1/4216* (2013.01); *H02M 1/4225* (2013.01); *H02M 3/1584* (2013.01); *H02P 23/28* (2016.02); *H02M 2003/1586* (2013.01); *Y02B 70/126* (2013.01)

(56) References Cited

U.S. PATENT DOCUMENTS

| | | |
|---|---|---|
| 8,659,276 B2 | 2/2014 | Skinner |
| 2006/0208687 A1* | 9/2006 | Takeoka .................. H02P 23/06 318/801 |
| 2010/0226149 A1 | 9/2010 | Masumoto |
| 2011/0096576 A1 | 4/2011 | Takahashi et al. |
| 2012/0313614 A1 | 12/2012 | Ohshita et al. |

FOREIGN PATENT DOCUMENTS

| | | |
|---|---|---|
| JP | 2010-233439 A | 10/2010 |
| JP | 2011-045218 A | 3/2011 |
| JP | 2011-091981 A | 5/2011 |
| JP | 2011-152017 A | 8/2011 |
| JP | 2011-223865 A | 11/2011 |
| JP | 2012-016164 A | 1/2012 |
| JP | 2012-029487 A | 2/2012 |
| JP | 2012-210145 A | 10/2012 |

OTHER PUBLICATIONS

Office Action dated Mar. 15, 2016 in the corresponding JP application No. 2014-511133 (with partial English translation).
Japanese Office Action dated Jul. 7, 2015 in the corresponding JP application No. 2014-511133. (English translation attached).
Juergen Biela et al. "SiC versus Si-Evaluation of Potentials for Performance Improvement of Inverter and DC-DC Converter Systems by SiC Power Semiconductors", IEEE Transactions on Industrial Electronics, vol. 58, No. 7, Jul. 1, 2011, pp. 2872-2882.
Xiaojun Xu et al. "A Novel Closed Loop Interleaving Strategy of Multiphase Critical Mode Boost PFC Converters", Applied Power Electronics Conference and Exposition, Twenty-Third Annual IEEE, Feb. 24, 2008, pp. 1033-1038.
Choudhury S et al. "A DSP based Digitally Controlled Interleaved PFC Converter" Applied Power Electronics Conference and Exposition, Twentieth Annual IEEE, vol. 1, Mar. 6, 2005, pp. 648-654.
Extended European Search Report dated Dec. 4, 2015 in the corresponding EP application No. 13778606.7.

* cited by examiner (a)

(b)

(c)

(a) DISCONTINUOUS MODE (b) CONTINUOUS MODE (c) CRITICAL MODE

POWER CONVERSION DEVICE, MOTOR DRIVE CONTROL APPARATUS INCLUDING THE POWER CONVERSION DEVICE, AIR BLOWER AND COMPRESSOR INCLUDING THE MOTOR DRIVE CONTROL APPARATUS, AND AIR CONDITIONER INCLUDING THE AIR BLOWER OR THE COMPRESSOR

CROSS REFERENCE TO RELATED APPLICATIONS

This application is a U.S. national stage application of PCT/JP2013/055011 filed on Feb. 26, 2013, and is based on Japanese Patent Application No. 2012-096897 filed on Apr. 20, 2012, the contents of which are incorporated herein by reference.

FIELD

The present invention relates to a power conversion device that converts an alternating-current power supply into a direct current and supplies the direct current to a load, a motor drive control apparatus including the power conversion device, an air blower and a compressor including the motor drive control apparatus, and an air conditioner including the air blower or the compressor.

BACKGROUND

In order to suppress defects caused by a harmonic component included in a power-supply current, there is an international regulation regarding electronic devices that generate a harmonic current. In order to clear the regulation, there is employed a method of conducting power-supply short-circuit in a converter with AC or DC chopping to suppress a harmonic current included in a power-supply current.

As a converter that performs DC chopping, there is an interleaved converter that connects a plurality of chopper circuits in parallel, where these chopper circuits are respectively switched with a different switching phase, and ripples caused by switching are canceled out in an input current serving as a sum of currents flowing in each of the chopper circuits, thereby suppressing a harmonic current. In the interleaved converter with this system, there is a case where variations such as shifting of switching phases in the respective chopper circuits, switching-on times, and slopes at the time of switching on and off occur, so that currents flowing into the respective chopper circuits become nonequivalent, and thus suppressing effects of a harmonic current are decreased. In this connection, for example, there is disclosed a technique in which, based on respective values of currents that flow into a plurality of chopper circuits, off-times of respective switching elements in each of switching cycles for controlling these switching elements in a critical mode are predicted and, based on the prediction result, switching control is executed on the respective switching elements so that switching phases have a desired phase difference, thereby equalizing distribution of currents to the respective chopper circuits (for example, Patent Literature 1).

CITATION LIST

Patent Literature

Patent Literature 1: Japanese Patent Application Laid-open No. 2011-91981

SUMMARY

Technical Problem

However, in the conventional technique described above, a reactor current needs to be detected individually in each of the chopper circuits, and thus the conventional technique is accompanied by increase of the number of parts, size, and cost of a current detection unit. Furthermore, because respective switching elements of the respective chopper circuits are operated in a critical mode, those switching elements do not cope with a continuous mode, which is suitable for large power with a higher current peak value or a lower current peak value. Meanwhile, when the respective switching elements are operated in the continuous mode, the switching elements are turned on or off at a position where the value of a reactor current does not become zero. Therefore, there are problems that, when the switching elements are operated in the continuous mode, as compared to a case of operating the switching elements in the critical mode or a discontinuous mode, distribution of currents among the respective chopper circuits tends to become nonequivalent, and thus suppressing effects of a harmonic current are difficult to achieve.

The present invention has been achieved in view of the above problem, and an object of the present invention is to provide a power conversion device that can improve suppressing effects of a harmonic current with a simpler configuration, regardless of the operation mode, in a configuration including a plurality of chopper circuits, and to provide a motor drive control apparatus including the power conversion device, an air blower and a compressor including the motor drive control apparatus, and an air conditioner including the air blower or the compressor.

Solution to Problem

The present invention is directed to a power conversion device that achieves the object. The power conversion device includes a plurality of chopper circuits connected in parallel, each chopper circuit including a reactor, a switching element, and a backflow prevention element for chopping an output of a rectifier that rectifies an alternating-current power supply to step up the output; a switching control unit that controls the plurality of the switching elements; a smoothing capacitor that smoothes outputs of the plurality of the chopper circuits; a rectified-voltage detection unit that detects a rectified voltage output from the rectifier; a bus-bar voltage detection unit that detects a bus-bar voltage smoothed by the smoothing capacitor; and a bus-bar current detection unit that detects a bus-bar current to which a rector current flowing into the reactors is added. The switching control unit includes an on-duty calculation unit that calculates a reference on-duty of respective drive pulses with respect to the switching elements based on the bus-bar voltage and the bus-bar current; an on-duty correction unit that corrects the reference on-duty and outputs respective on-duties of the respective drive pulses based on the bus-bar current, so that change amounts of the bus-bar current become substantially same; and a drive-pulse generation unit that generates the respective drive pulses based on the respective on-duties.

Advantageous Effects of Invention

According to the present invention, it is possible to obtain a power conversion device that can improve suppressing effects of a harmonic current with a simpler configuration, regardless of the operation mode, in a configuration including a plurality of chopper circuits.

DESCRIPTION OF EMBODIMENTS

Exemplary embodiments of a power conversion device, a motor drive control apparatus including the power conversion device, an air blower and a compressor both including the motor drive control apparatus, and an air conditioner including the air blower or the compressor according to the present invention will be explained below in detail with reference to the accompanying drawings. The present invention is not limited to the embodiments.

First Embodiment

Figure 1:
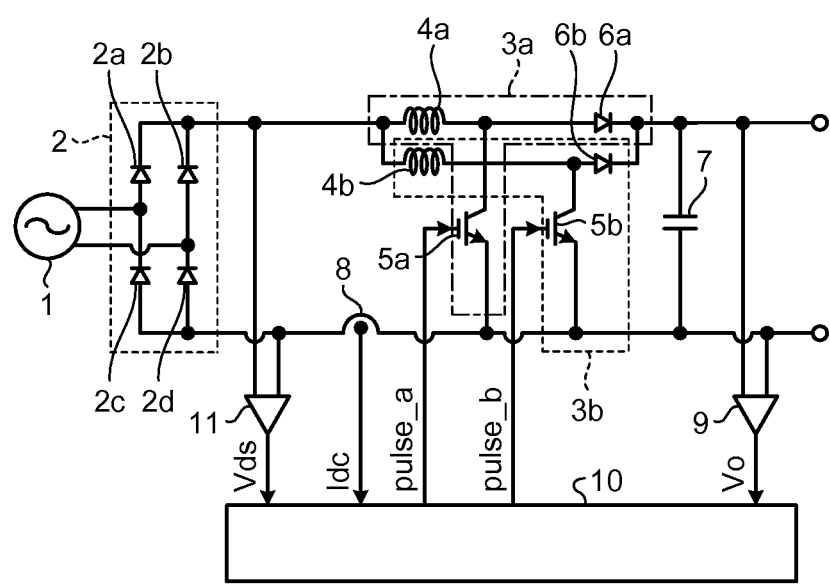
FIG. 1 is a diagram showing a configuration example of a power conversion device according to a first embodiment.

FIG. 1 is a diagram showing a configuration example of a power conversion device according to a first embodiment. As shown in FIG. 1, the power conversion device according to the first embodiment includes a single-phase rectifier (hereinafter, simply "rectifier") 2 that rectifies an alternating-current voltage of a single-phase alternating-current power supply (hereinafter, simply "alternating-current power supply") 1, chopper circuits 3a and 3b, a smoothing capacitor 7 that smoothes output of the chopper circuits 3a and 3b, a bus-bar current detection unit 8, a bus-bar voltage detection unit 9, and a switching control unit 10. The rectifier 2 is made up of four rectifier diodes 2a to 2d forming a bridge. The chopper circuit 3a is made up of a reactor 4a, a switching element 5a, and a backflow preventing element 6a, and the chopper circuit 3b consists of a reactor 4b, a switching element 5b, and a backflow preventing element 6b. The chopper circuit 3a and the chopper circuit 3b are connected in parallel. Each of the switching elements 5a and 5b is made up of an IGBT (Insulated Gate Bipolar Transistor), for example, and each of the backflow preventing elements 6a and 6b is made up of a fast recover diode, for example.

The switching control unit 10 generates, based on respective output signals from the bus-bar current detection unit 8 and the bus-bar voltage detection unit 9, drive pulses that respectively drive each of the switching elements 5a and 5b. The bus-bar current detection unit 8 detects a bus-bar current (Idc) that is a current flowing from the rectifier 2 to a load (not shown) and the load to the rectifier 2, and outputs the detected current to the switching control unit 10. The bus-bar voltage detection unit 9 detects a bus-bar voltage (Vo), which is a voltage generated by smoothing an output voltage from the chopper circuit 3 by the smoothing capacitor 7, and outputs the voltage to the switching control unit 10. A rectified-voltage detection unit 11 detects a rectified voltage (Vds) that is a voltage rectified by the rectifier 2, and outputs the rectified voltage to the switching control unit 10.

The example shown in FIG. 1 exemplifies a configuration example in which the alternating-current power supply 1 is a single-phase alternating-current power supply and the rectifier 2 is a single-phase rectifier; however, it is also possible to configure that the alternating-current power supply 1 is a three-phase alternating-current power supply and the rectifier 2 is a three-phase rectifier. Furthermore, the example shown in FIG. 1 exemplifies a configuration example in which two chopper circuits are connected in parallel; however, it is also possible to configure that three or more chopper circuits are connected in parallel.

Figure 2:
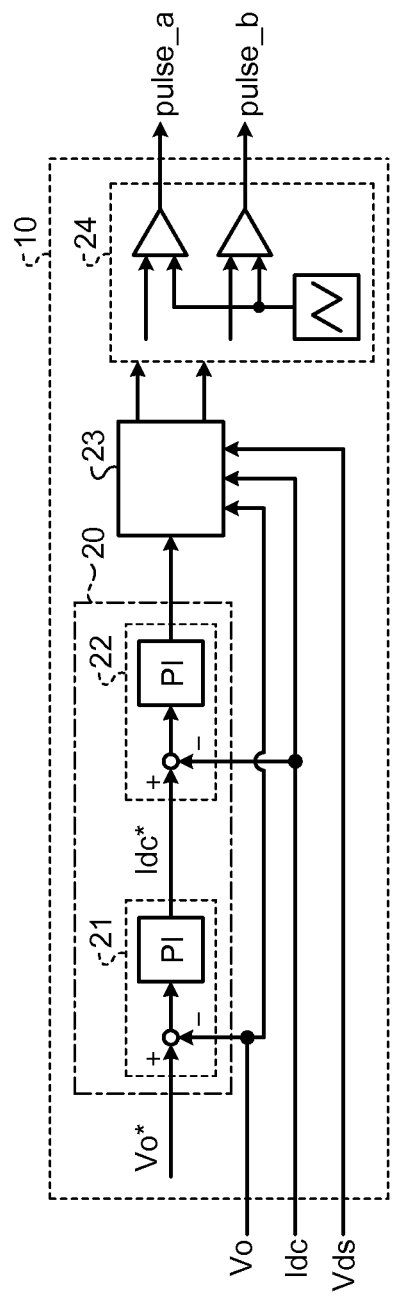
FIG. 2 is a diagram showing a configuration example of a switching control unit of the power conversion device according to the first embodiment.

FIG. 2 is a diagram showing a configuration example of a switching control unit of the power conversion device according to the first embodiment. As shown in FIG. 2, the switching control unit 10 includes an on-duty calculation unit 20 containing a bus-bar-current command-value control unit 21 and an on-duty control unit 22, an on-duty correction unit 23, and a drive-pulse generation unit 24. The switching control unit 10 is comprised of a computation unit such a microcomputer.

The bus-bar-current command-value control unit 21 computes a bus-bar current command value (Idc*) based on the bus-bar voltage (Vo) as an output signal from the bus-bar voltage detection unit 9 and a bus-bar voltage command value (Vo*) as a value set in advance, for example. The computation of the bus-bar current command value (Idc*) is performed by, for example, executing proportional integration control on a difference between the bus-bar voltage (Vo) as an output signal from the bus-bar voltage detection unit 9 and the bus-bar voltage command value (Vo*).

The on-duty control unit 22 computes a reference on-duty (duty) of the respective switching elements 5a and 5b based on the bus-bar current command value (Idc*) computed by the bus-bar-current command-value control unit 21 and the bus-bar current (Idc) detected by the bus-bar current detection unit 8. The computation of the reference on-duty (duty) is performed by, for example, executing proportional integration control on a difference between the bus-bar current command value (Idc*) as an output value from the bus-bar-current command-value control unit 21 and the bus-bar current (Idc) as an output signal from the bus-bar current detection unit 8.

The on-duty correction unit 23 corrects the reference on-duty (duty) of the respective switching elements 5a and 5b computed by the on-duty control unit 22, and generates an on-duty (Daon) of the switching element 5a and an on-duty (Dbon) of the switching element 5b.

The drive-pulse generation unit 24 generates drive pulses (pulse_a and pulse_b) for respectively operating each of the switching elements 5a and 5b based on each of the on-duties (Daon and Dbon) generated by the on-duty correction unit 23, and outputs the generated drive pulses.

As a control parameter used for computations in the bus-bar-current command-value control unit 21 and the on-duty control unit 22, there is an optimum value according to an operation status of a circuit, where examples of the operation status include a case where it is preferable that a proportional control gain in the on-duty control unit 22 is changed as the proportional control gain is inversely proportional to a bus-bar voltage. Therefore, it is also possible to provide a calculation formula corresponding to a rectified voltage as an output voltage of the rectifier 2, the bus-bar current (Idc), and the bus-bar voltage (Vo), or a table, thereby adjusting the control parameter according to an operation status of a circuit.

Furthermore, while proportional integration control has been mentioned as a computation method in the bus-bar-current command-value control unit 21 and the on-duty control unit 22, the present invention is not limited to such a control computation method, and other computation methods, such as adding derivative terms to proportional integration control so as to execute proportional integration derivative control, can be used. Further, computation methods used for the bus-bar-current command-value control unit 21 and the on-duty control unit 22 do not need to be the same.

Operations of the on-duty correction unit 23 are explained below along with operations of the respective chopper circuits 3a and 3b. A case where the switching element 5a of the chopper circuit 3a is switched on and off is explained first. The rectified voltage (Vds) as output of the rectifier 2 is input to the chopper circuit 3a, output of the chopper circuit 3a is smoothed by the smoothing capacitor 7, and the bus-bar voltage (Vo) is obtained. In the chopper circuit 3a, when the switching element 5a is switched on, conduction to the backflow preventing element 6a is blocked, and the rectified voltage (Vds) is applied to the reactor 4a. On the other hand, when the switching element 5a is switched off, conduction to the backflow preventing element 6a is made, and a voltage corresponding to a difference between the rectified voltage (Vds) and the bus-bar voltage (Vo) is induced to the reactor 4a in a direction opposite to that when the switching element 5a is switched on. At this time, energy accumulated in the reactor 4a when the switching element 5a is switched on can be understood to be shifted to a load when the switching element 5a is switched off. If energy input to the reactor 4a and that output from the reactor 4a at the time of switching on and off the switching element 5a are equal, a relationship among the on-duty (Daon), the rectified voltage (Vds), and the bus-bar voltage (Vo) of the switching element 5a is expressed by the following equation (1).

$$Vo=Vds/(1-Daon) \quad (1)$$

As is obvious from the above equation (1), an output voltage of the chopper circuit 3a, that is, the bus-bar voltage (Vo), can be controlled by controlling the on-duty (Daon) of the switching element 5a.

A relationship between a reactor current (ILaon) flowing into a reactor and the on-duty (Daon) in the chopper circuit 3a is explained next. When the switching element 5a is switched on, as described above, the rectified voltage (Vds) is applied to the reactor 4a. At this time, a reactor current (ILa) flowing in the reactor 4a from the alternating-current power supply 1 to a load increases linearly. When a reactor current flowing into the reactor 4a at this time is denoted as "ILaon" and an inductance value of the reactor 4a is denoted as "La", a slope "ΔILaon" of the reactor current ILaon is expressed by the following equation (2).

$$\Delta ILaon=Vds/La \quad (2)$$

When the switching element 5a is switched off, that is, during a period where the drive pulse (pulse_a) is "L", as described above, a voltage corresponding to a difference between the rectified voltage (Vds) and the bus-bar voltage (Vo) is applied in a direction opposite to that when the switching element 5a is switched on, and the reactor current (ILa) flowing in the reactor 4a from the alternating-current power supply 1 to a load decreases linearly. When a reactor current flowing into the reactor 4a at this time is denoted as "ILaoff", a slope "ΔILaoff" of the reactor current ILaoff is expressed by the following equation (3).

$$\Delta ILaoff=(Vds-Vo)/La \quad (3)$$

Similarly, a relationship among the on-duty (Dbon), the rectified voltage (Vds), and the bus-bar voltage (Vo) of the switching element 5b is expressed by the following equation (4).

$$Vo=Vds/(1-Dbon) \quad (4)$$

Furthermore, when the switching element 5b is switched on, a reactor current (ILb) flowing into the reactor 4b from the alternating-current power supply 1 to a load increases linearly. When a reactor current flowing into the reactor 4b at this time is denoted as "ILbon" and an inductance value of the reactor 4b is denoted as "Lb", a slope "ΔILbon" of the reactor current ILbon is expressed by the following equation (5).

$$\Delta ILbon=Vds/Lb \quad (5)$$

When the switching element 5b is switched off, the reactor current (ILb) flowing in the reactor 4b from the alternating-current power supply 1 to a load decreases linearly. When a reactor current at this time is "ILboff", a slope ΔILboff of the reactor current ILboff is expressed by the following equation (6).

$$\Delta ILboff=(Vds-Vo)/Lb \quad (6)$$

As described above, the respective on-duties (Daon and Dbon) of the respective switching elements 5a and 5b can be calculated in the switching control unit 10 by using the bus-bar voltage (Vo), the rectified voltage (Vds), the reactor current (ILa), and the reactor current (ILb). In a section where respective on-periods of the respective switching elements 5a and 5b do not overlap on each other, the bus-bar current (Idc) detected by the bus-bar current detection unit 8 has a value equal to (ILaon+ILboff) or (ILaoff+ILbon). That is, the respective on-duties (Daon and Dbon) of the respective switching elements 5a and 5b can be calculated by using the bus-bar current (Idc) that is detected by the bus-bar current detection unit 8.

In the present embodiment, for example, in the example shown in FIG. 1, during a switching cycle of each of the switching elements 5a and 5b, an on-timing phase of the switching element 5b is controlled to delay for a half cycle (180°) with respect to an on-timing of the switching element 5a. With this control, ripples of the bus-bar current (Idc), which is an aggregate current of the reactor current (ILa) and the reactor current (ILb), caused by switching of the respective switching elements 5a and 5b are offset. For example, in a case where the power conversion device according to the present embodiment is constituted by connecting n chopper circuits in parallel, if a switching phase difference of the switching elements of the respective chopper circuits is set to be (360/n)°, the ripples of the bus-bar current (Idc) can be made minimum. The present invention is not limited to the switching phase difference of the switching elements of the plurality of chopper circuits.

Figure 3:
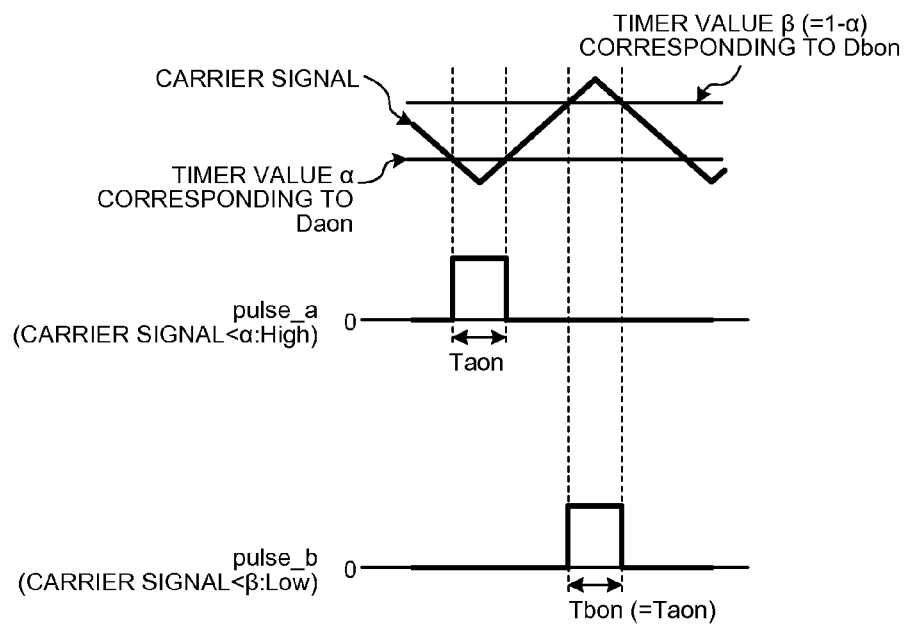
FIG. 3 is a diagram showing a relationship between a carrier signal and a timer value of the power conversion device according to the first embodiment and showing respective waveforms of respective drive pulses.

Next, an example of a method for generating the respective drive pulses (pulse_a and pulse_b) of the respective switching elements 5a and 5b such that phases of on-timings of the switching elements 5a and 5b are different for a half cycle (180°). FIG. 3 is a diagram showing a relationship between a carrier signal and a timer value of the power conversion device according to the first embodiment and showing respective waveforms of respective drive pulses.

The drive-pulse generation unit 24 compares a carrier signal of a triangle wave and respective timer values α and β, which correspond to the respective on-duties (Daon and Dbon) of the respective switching elements 5a and 5b, and generates the respective drive pulses (pulse_a and pulse_b) of the respective switching elements 5a and 5b according to the magnitude of the comparison result.

For example, as shown in FIG. 3, by setting the timer value α corresponding to the on-duty (Daon) of one of switching elements (in this case, the switching element 5a) as a reference, the timer value β corresponding to the on-duty (Dbon) of the other switching element (in this case, the switching element 5b) is set as a value (1−α), which is obtained by subtracting the timer value α corresponding to the on-duty (Daon) of one of switching elements (in this case, the switching element 5a) from 1, and the carrier signal of the triangle wave is compared to each of the timer value α corresponding to the on-duty Daon and the timer value β (=1−α) corresponding to the on-duty Dbon.

Thereafter, by generating the drive pulse (pulse_a) of the switching element 5a that becomes "High" when the timer value α corresponding to the on-duty Daon is larger than the carrier signal and becomes "Low" when the timer value α corresponding to the on-duty Daon is smaller than the carrier signal, and by generating the drive pulse (pulse_b) of the switching element 5b that becomes "Low" when the timer value β (=1−α) corresponding to the on-duty Dbon is larger than the carrier signal and becomes "High" when the timer value β (=1−α) corresponding to the on-duty Dbon is smaller than the carrier signal, the drive pulse (pulse_a) of the switching element 5a in which phases of on-timings are different for 180° and on-periods are equal (Taon=Tbon) and the drive pulse (pulse_b) of the switching element 5b can be obtained.

The relationship between the magnitude among the carrier signal at the time of generating the respective drive pulses (pulse_a and pulse_b) and the respective timer values α and β and "High" and "Low" of these drive pulses (pulse_a and pulse_b) is not limited to the example described above, and it suffices as long as relationships between the respective on-duties (Daon and Dbon) and the respective on-periods (Taon and Tbon) of the respective drive pulses (pulse_a and pulse_b) match each other.

Figure 4:
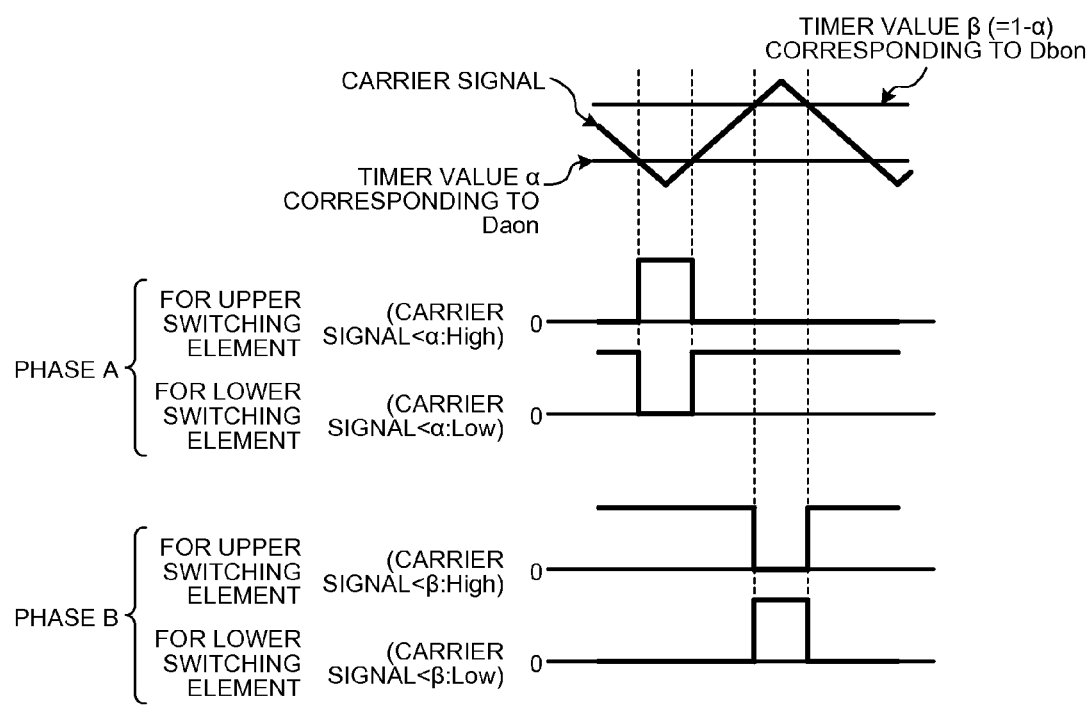
FIG. 4 is a diagram showing a relationship between a carrier signal and a timer value of the power conversion device according to the first embodiment and showing respective waveforms of respective drive pulses.

For example, there are general-purpose microcomputers used for motor control and the like that include a function of generating complementary PWM of a three-phase inverter. When drive pulses of upper and lower switching elements of respective phases are generated based on timer values corresponding to on-duties of respective switching elements of the three-phase inverter, as described above, if two drive pulses having a phase respectively different for a half cycle are generated, the function of generating complementary PWM of the three-phase inverter can be used. FIG. 4 is a diagram showing a relationship between a carrier signal and a timer value when a function of generating complementary PWM of a three-phase inverter and showing respective waveforms of respective drive pulses.

As shown in FIG. 4, when the function of generating complementary PWM of a three-phase inverter is used, as timer values of arbitrary two phases among three phases are set by using the relationship of the timer values α and β (=1−α) described above, as for a drive pulse for a switching element on an upper side (or a lower side) generated based on the timer value α corresponding to the on-duty (Daon) of a switching element of an upper side (or a lower side) of an arm of one phase (a phase A in the example shown in FIG. 4) and a drive pulse for a switching element of a lower side (or an upper side) generated based on the timer value β (=1−α) corresponding to the on-duty (Dbon) of a switching element of a lower side (or an upper side) of an arm of the other phase (a phase B shown in the example of FIG. 4), these drive pulses have a relationship such that phases thereof are different for a half cycle. By using the function of generating complementary PWM of a three-phase inverter, as timer values are set on software without changing the magnitude of a carrier signal and respective timer values at the time of generating respective drive pulses and conditions of "High" and "Low" of these drive pulses, drive pulses having a relationship such that phases thereof are different for a half cycle can be easily generated.

In the respective chopper circuits 3a and 3b, even when the on-duties (Daon and Dbon) of the respective switching elements 5a and 5b have the same value, the slopes (ΔILaon and ΔILbon) at the on-timing and the slopes (ΔILaoff and ΔILboff) at the off-timing of the respective switching elements 5a and 5b shown in the equations (2), (3), (5), and (6) described above have different values due to errors of the rectified voltage (Vds) caused by a phase difference at the on-timings of the switching elements 5a and 5b, variations of the respective inductance values La and Lb of the respective reactors 4a and 4b, and the like, unbalance of change amounts of the bus-bar current (Idc) in the respective on-periods of the respective switching elements 5a and 5b occurs, distortion in the bus-bar current (Idc) is generated, and a harmonic component of an input current is increased.

Therefore, in the first embodiment, in the on-duty correction unit 23, by using the bus-bar current (Idc) and the bus-bar voltage (Vo), the reference on-duty (duty) computed by the bus-bar-current command-value control unit 21 and the on-duty control unit 22 is corrected to on-duties that are preferable for the respective chopper circuits 3a and 3b according to errors of the rectified voltage (Vds) caused by a phase difference at the on-timings of the respective switching elements 5a and 5b in the respective chopper circuits 3a and 3b or variations of the respective inductance values La and Lb of the respective reactors 4a and 4b. With this operation, increase of a harmonic component in an input current mentioned above can be suppressed.

Figure 5:
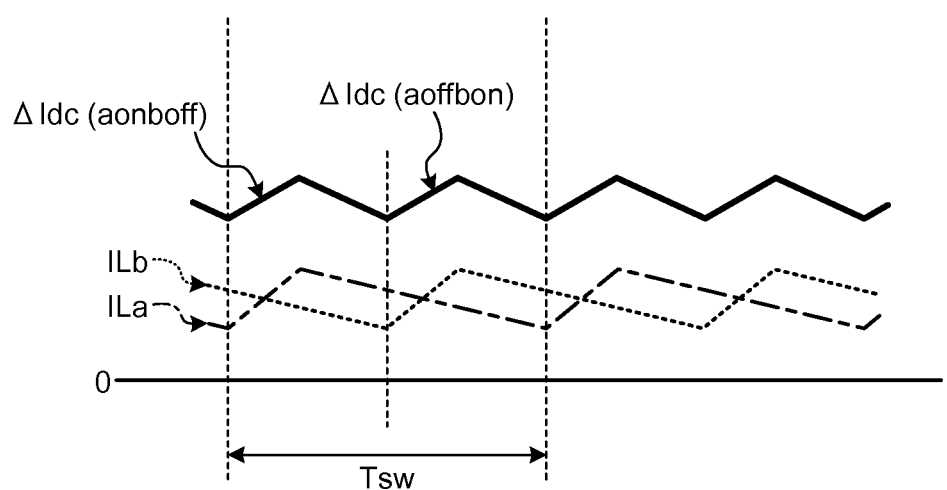
FIG. 5 is a diagram showing slopes of a bus-bar current in respective on-periods of respective switching elements.
Figure 6:
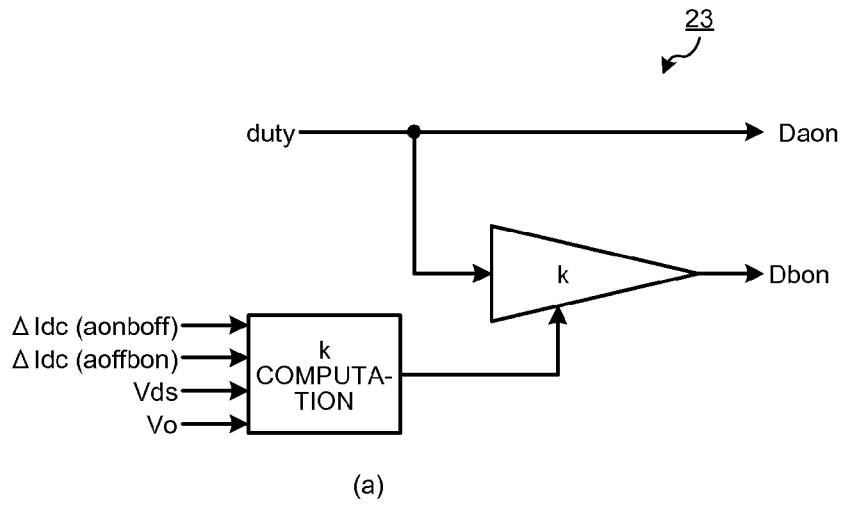
FIG. 6 are diagrams showing examples of an internal functional block of an on-duty correction unit of the power conversion device according to the first embodiment.
Figure 6:
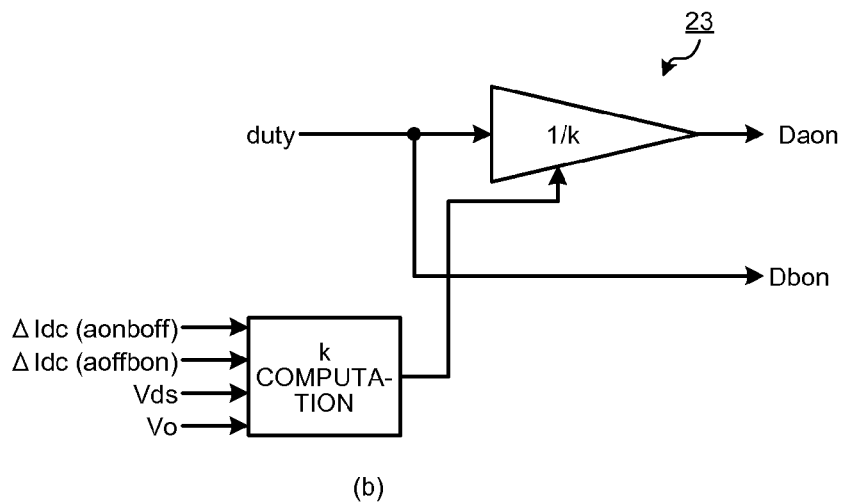
Figure 6:
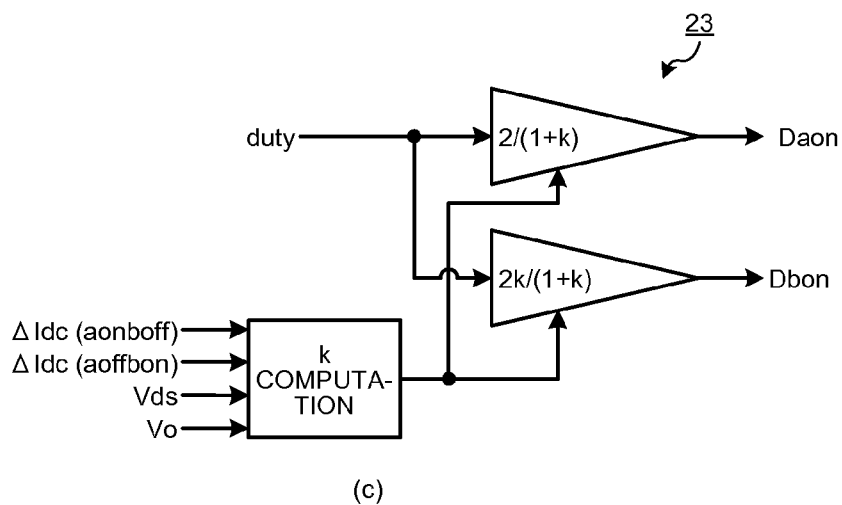

Next, an on-duty correction method in the on-duty correction unit 23 of the power conversion device according to the present embodiment is explained with reference to FIG. 5 and FIG. 6. FIG. 5 is a diagram showing slopes of a bus-bar current in respective on-periods of respective switching elements. FIG. 6 are diagrams showing examples of an internal functional block of the on-duty correction unit of the power conversion device according to the first embodiment.

When a switching frequency is sufficiently high with respect to a power-supply frequency, errors of the rectified voltage (Vds) due to a phase difference of on-timings of the respective switching elements 5a and 5b in one switching cycle Tsw are small. Meanwhile, generally, because manufacturing variations are relatively large, the inductance values La and Lb of the reactors 4a and 4b are more influenced by the manufacturing variations than errors of the rectified voltage (Vds). Therefore, in the present embodiment, ratios of the inductance values La and Lb are calculated by using slopes of the respective reactor currents (ILa and ILb) in the respective on-periods of the respective switching elements 5a and 5b, the reference on-duty based on the calculated ratios is corrected, and the respective on-duties (Daon and Dbon) are generated, thereby controlling the change amounts of the bus-bar currents (Idc) in the respective on-periods of the switching elements 5a and 5b to be equal.

When the switching phase difference between the respective switching elements 5a and 5b is 180° and the reference on-duty (duty) is equal to or less than 50%, the bus-bar current (Idc) in the on-period of the switching element 5a is a sum of the reactor current ILaon flowing into the reactor 4a that linearly increases with the slope $\Delta$ILaon and the reactor current ILboff flowing into the reactor 4b that linearly decreases with the slope $\Delta$ILboff. Therefore, a current slope $\Delta$Idc(aonboff) of a bus-bar current in this section (that is, the on-period of the switching element 5a) is expressed by the following equation (7) based on the equations (2) and (6) described above.

$$\Delta Idc(aonboff) = \Delta ILaon + \Delta ILboff = Vds/La + (Vds - Vo)/Lb \quad (7)$$

Similarly, the bus-bar current (Idc) in the on-period of the switching element 5b is a sum of the reactor current ILaoff flowing into the reactor 4a that linearly decreases with the slope $\Delta$ILaoff and the reactor current ILbon flowing into the reactor 4b that linearly increases with the slope $\Delta$ILbon. Therefore, a current slope $\Delta$Idc(aoffbon) of a bus-bar current in this section (that is, the on-period of the switching element 5b) is expressed by the following equation (8) based on the equations (3) and (5) described above.

$$\Delta Idc(aoffbon) = \Delta ILaoff + \Delta ILbon = (Vds - Vo)/La + Vds/Lb \quad (8)$$

A ratio k between the inductance values La and Lb is expressed by the following equation (9) based on the equations (7) and (8).

$$k = (Lb/La) = (\Delta Idc(aonboff) * Vds + \Delta Idc(aoffbon) * (Vo - Vds))/(\Delta Idc(aoffbon) * Vds + \Delta Idc(aonboff) * (Vo - Vds)) \quad (9)$$

In the on-duty correction unit 23, by correcting the reference on-duty (duty) so as to set the ratios of the respective on-duties (Daon and Dbon) of the respective switching elements 5a and 5b to be the ratio k shown in the equation (9), the change amounts of the reactor currents (ILaon and ILbon) flowing into the respective reactors 4a and 4b in the respective on-periods of the switching elements 5a and 5b can be set equal.

At this time, for example, as shown in FIG. 6(a), by using the ratio k of the inductance value Lb having the inductance value La as a reference, it is possible to set the reference on-duty (duty) computed by the on-duty control unit 22 as the on-duty (Daon) of the switching element 5a and the on-duty (Dbon) of the switching element 5b as an on-duty that is k times as large as the on-duty (Daon) of the switching element 5a. Alternatively, for example, as shown in FIG. 6(b), by using a ratio (1/k) of the inductance value La having the inductance value Lb as a reference, the reference on-duty (duty) computed by the on-duty control unit 22 as the on-duty (Dbon) of the switching element 5b and the on-duty (Daon) of the switching element 5a as an on-duty that is (1/k) times as large as the on-duty (Dbon) of the switching element 5b. Alternatively, for example, as shown in FIG. 6(c), by having the reference on-duty (duty) computed by the on-duty control unit 22 as a reference, the on-duty of the switching element 5a is set to be an on-duty that is (2/(1+k)) times as large as the reference on-duty (duty), and the on-duty of the switching element 5b as an on-duty that is (2k/(1+k)) times as large as the reference on-duty (duty).

Figure 7:
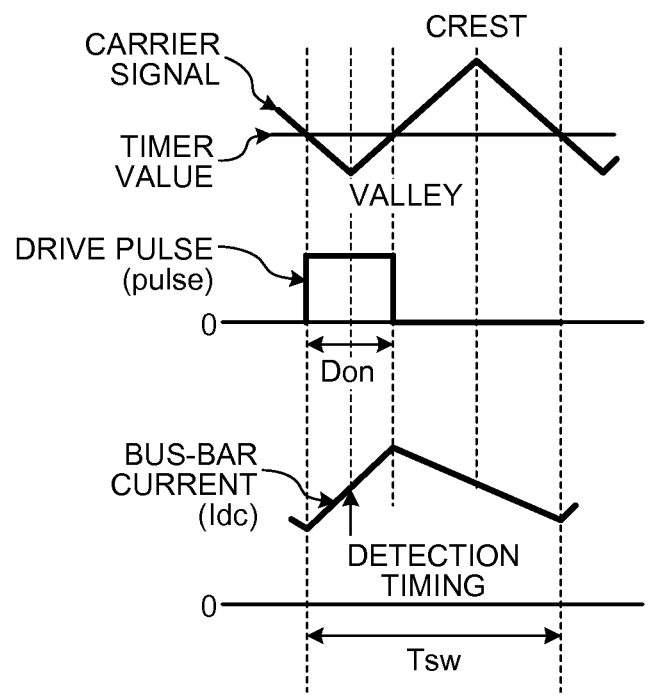
FIG. 7 is a diagram showing respective waveform charts of a carrier signal, a drive pulse, and a bus-bar current of the power conversion device according to the first embodiment.
Figure 8:
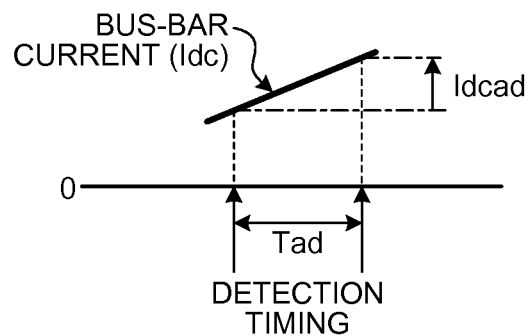
FIG. 8 is a diagram showing slopes of a bus-bar current at a bus-bar current detection timing of the power conversion device according to the first embodiment.

Next, a method of calculating respective change ratios per unit time of the slopes ($\Delta$Idc(aonboff) and $\Delta$Idc(aoffbon)) of the bus-bar current (Idc), that is, the bus-bar current (Idc) in respective on-periods of respective drive pulses, is explained next with reference to FIG. 7 and FIG. 8. FIG. 7 is a diagram showing respective waveform charts of a carrier signal, a drive pulse, and a bus-bar current of the power conversion device according to the first embodiment. FIG. 8 is a diagram showing slopes of a bus-bar current at a bus-bar current detection timing of the power conversion device according to the first embodiment. In the following explanations, unless the respective chopper circuits 3a and 3b and constituent elements thereof are otherwise specified, the suffixes "a" and "b" of these reference signs are omitted.

When the switching control unit 10 is realized by using a computation unit such as a microcomputer, an analog value of the bus-bar current (Idc) detected by the bus-bar current detection unit 8 is imported as a digital value at a timing where the digital value is synchronized with a trough or a crest of a carrier signal within the microcomputer. As described above, in the drive-pulse generation unit 24, when a drive pulse (pulse) of the switching element 5 is generated by comparing an on-duty (Don) and a carrier signal, the apex of the trough or the apex of the crest of the carrier signal becomes the center of the on-period of the drive pulse (pulse) of the switching element 5. The example shown in FIG. 7 exemplifies a case where the apex of the trough of a carrier signal in one switching cycle Tsw is the center of the on-period of the drive pulse (pulse) of the switching element 5.

When the bus-bar current (Idc) is imported as a digital value, an output terminal of the bus-bar current detection unit 8 is connected to at least two ports of A/D (Analog/Digital) conversion ports of a microcomputer. Sampling is designed to be performed with a time difference between the two A/D conversion ports, and as shown in FIG. 8, by dividing a difference value Idcad of the bus-bar current in the two A/D conversion ports by a time difference Tad, a slope of the bus-bar current (Idc) in the on-period of a drive pulse (pulse) can be detected. In this case, it is assumed that the time difference Tad is sufficiently shorter than an on-period, and a change amount (that is, Idcad) of the bus-bar current (Idc) in the on-period of the switching element 5 is detected.

In this example, in the configuration shown in FIG. 1, that is, in a configuration in which a plurality of chopper circuits 3a and 3b are connected in parallel, as shown in FIG. 3, the center in the on-period of the drive pulse (pulse_a) of the switching element 5a of the chopper circuit 3a is synchronized with the apex of the trough of the carrier signal, and the center in the on-period of the drive pulse (pulse_b) of the switching element 5b of the chopper circuit 3b is synchronized with the apex of the crest of the carrier signal. In this case, the bus-bar current (Idc) is detected as the center of the carrier signal is synchronized with both apexes of the trough and crest of the carrier signal, and then the slopes (ΔIdc (aonboff) and ΔIdc(aoffbon)) of the bus-bar current (Idc) in the respective on-periods of the respective drive pulses (pulse_a and pulse_b) are calculated.

The slopes (ΔIdc(aonboff) and ΔIdc(aoffbon)) of the bus-bar current (Idc) in the respective on-periods of the respective drive pulses (pulse_a and pulse_b) can be calculated by differentiating the bus-bar current (Idc). When the switching frequency is sufficiently lower than the clock frequency of the microcomputer that realizes the switching control unit 10, it is possible to import the bus-bar current (Idc) to perform a differential operation on software. Alternatively, it is also possible to configure that a differentiation circuit is provided on hardware, which is located outside of the switching control unit 10, thereby importing an output signal from the differentiation circuit in the switching control unit 10.

In the example described above, there has been explained a method of detecting the bus-bar current (Idc) when the power conversion device is in operation, calculating the slopes (ΔIdc(aonboff) and ΔIdc(aoffbon)) of the bus-bar current (Idc) in the respective on-periods of the respective drive pulses (pulse_a and pulse_b) of the respective chopper circuits 3a and 3b, and calculating the ratio k between the inductance values La and Lb of the reactor 4a and 4b of the respective chopper circuits 3a and 3b; however, it is also possible to calculate the ratio k between the respective inductance values La and Lb of the respective reactors 4a and 4b of the respective chopper circuits 3a and 3b by detecting the bus-bar current (Idc) in a state where the respective switching elements 5a and 5b are individually switched on before operating the power conversion device.

For example, when the bus-bar current (Idc) is detected in a state where the switching element 5a of one of the chopper circuits 3a is switched on, the bus-bar current (Idc) at this time is equal to the reactor current (ILaon) flowing into the reactor 4a. Similarly, when the bus-bar current (Idc) is detected in a state where the switching element 5b of the chopper circuit 3b is switched on, the bus-bar current (Idc) at this time is equal to the reactor current (ILbon) flowing into the reactor 4b.

That is, as the reactor current (ILaon) in a state where the switching element 5a of the chopper circuit 3a is switched on and the reactor current (ILbon) in a state where the switching element 5b of the chopper circuit 3b is switched on are obtained by detecting the bus-bar current (Idc) in a state where the respective switching elements 5a and 5b are individually switched on, it becomes possible to calculate the ratio k between the respective inductance values La and Lb of the respective reactors 4a and 4b of the respective chopper circuits 3a and 3b.

The ratio k between the respective inductance values La and Lb calculated by the above method is a ratio in a steady state. Therefore, the ratio k is effective when the cause of unbalance in the change amount of the bus-bar current (Idc) in the respective on-periods of the respective switching elements 5a and 5b occurring when the power conversion device is in operation as described above is variations in the inductance values of the respective reactors 4a and 4b, when direct-current superimposition characteristics of the respective reactors 4a and 4b are favorable, and when the change amount of the inductance values is small even when the current values of the reactor currents (ILaon and ILbon) are changed, that is, the ratio k is effective in a case where unbalance in the change amount of the bus-bar current (Idc) in the respective on-periods of the respective switching elements 5a and 5b occurs constantly regardless of an operation load and the necessity of real-time on-duty correction is low.

By performing on-duty correction using the ratio k between the respective inductance values La and Lb calculated before operating the power conversion device, it becomes unnecessary to calculate the ratio k between the respective inductance values La and Lb when the power conversion device is in operation, and the calculation load of software can be decreased, so that the switching control unit 10 can be constituted by a microcomputer or the like, which has a lower computation processing performance and is manufactured at a lower cost.

Furthermore, when, in switching operations of the respective switching elements 5a and 5b during one cycle of an alternating-current power supply, correction of the respective on-duties (Daon and Dbon) described above is performed at least once and correction of the respective on-duties (Daon and Dbon) is not performed, the number of times of performing on-duty correction can be decreased by, for example, applying the reference on-duty (duty) to the respective on-duties. With this configuration, the calculation load of software can be further decreased, and effects of decreasing the calculation load of a microcomputer can be further improved.

Figure 9:
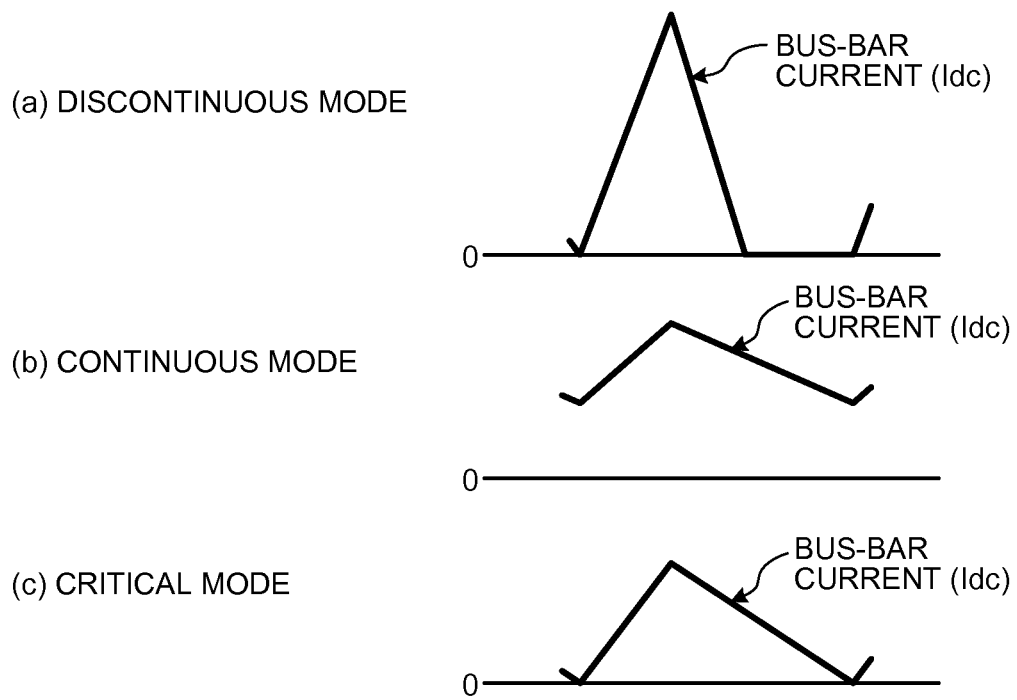
FIG. 9 are diagrams showing a switching operation mode of the power conversion device according to the first embodiment.

Next, a switching operation mode of the respective switching elements 5a and 5b of the respective chopper circuits 3a and 3b is explained with reference to FIG. 9. FIG. 9 are diagrams showing a switching operation mode of the power conversion device according to the first embodiment.

The reactor current flowing into the respective reactors 4a and 4b lineally repeats increasing and decreasing according to switching on and off of the respective switching elements 5a and 5b as expressed in the equations (2), (3), (5), and (6) described above. When the slope is large, on which the rectified voltage (Vds) is low and the reactor currents (ILa and ILb) flowing into the respective reactors 4a and 4b after the respective switching elements 5a and 5b are switched off are decreased, or when off-periods of the switching elements 5a and 5b are longer than the respective on-periods thereof, as shown in FIG. 9(a), there is a case where the reactor currents (ILa and ILb) flowing into the respective reactors 4a and 4b become zero during the off-periods of the respective switching elements 5a and 5b. Because any negative current does not flow into the respective reactors 4a and 4b, when the reactor currents (ILa and ILb) flowing into the reactors 4a and 4b after switching off the switching elements 5a and 5b reach zero, the reactor currents (ILa and ILb) flowing into the reactors 4a and 4b remain zero until the switching elements 5a and 5b are switched on again. Such an operation state in which there is a period where the currents (ILa and ILb) flowing into the respective reactors 4a and 4b during one cycle of respective pulses with respect to the switching elements 5a and 5b are decreased and become zero is referred to as "discontinuous mode".

On the other hand, when the slope is small, on which the rectified voltage (Vds) is high and the reactor currents (ILa and ILb) flowing into the respective reactors 4a and 4b are decreased, or when respective off-periods of the switching elements 5a and 5b are shorter than the respective on-periods thereof, as shown in FIG. 9(b), in the off-periods of the respective switching elements 5a and 5b, the reactor currents (ILa and ILb) flowing into the reactors 4a and 4b does not reach zero, and positive rector currents (ILa and ILb) continuously flow into the reactors 4a and 4b until the switching elements 5a and 5b are switched on again. Such an operation state in which there is no period where the currents (ILa and ILb) flowing into the respective reactors 4a and 4b during one cycle of respective pulses with respect to the switching elements 5a and 5b become zero is referred to as "continuous mode".

Furthermore, as shown in FIG. 9(c), an operation state in which the respective switching elements 5a and 5b are switched on at the instant when the reactor currents (ILa and ILb) flowing into the respective reactors 4a and 4b during off-periods of the respective switching elements 5a and 5b have become zero is referred to as "critical mode", which means a boundary between the continuous mode and the discontinuous mode.

When switching frequencies of the respective switching elements 5a and 5b are fixed frequencies, if the input voltage of the respective chopper circuits 3a and 3b fluctuates for the amount of an alternating-current frequency component, such as the rectified voltage (Vds) generated by rectifying an alternating current shown in FIG. 1, it is difficult to operate the switching elements 5a and 5b always in the critical mode. Therefore, when the switching elements 5a and 5b are operated in the critical mode, it is necessary to cause a fluctuation of the switching frequencies of the respective switching elements 5a and 5b, to detect that the reactor currents (ILa and ILb) flowing into the respective reactors 4a and 4b during off-periods of the switching elements 5a and 5b have become zero, and to switch on the switching elements 5a and 5b; however, because the switching elements 5a and 5b are in a state where the current value thereof is constantly zero at an on-timing, there is no possibility that errors of the reactor currents (ILa and ILb) flowing into the respective reactors 4a and 4b between the plurality of chopper circuits 3a and 3b are accumulated.

Also in the discontinuous mode, similarly to the case of the critical mode, at an on-timing of the respective switching elements 5a and 5b, the switching elements 5a and 5b are in a state where the current value thereof is constantly zero, and thus there is no possibility that errors of the reactor currents (ILa and ILb) flowing into the respective reactors 4a and 4b between the plurality of chopper circuits 3a and 3b are accumulated.

Meanwhile, in an operation region of the continuous mode, the reactor currents (ILa and ILb) at the on-timings of the respective switching elements 5a and 5b are not constant. Therefore, differently from the cases of the discontinuous mode and the critical mode in which the reactor currents (ILa and ILb) are constantly zero at the on-timings of the respective switching elements 5a and 5b, when there are errors in the reactor currents (ILa and ILb) flowing into the respective reactors 4a and 4b between the plurality of chopper circuits 3a and 3b, these errors are accumulated.

In the present embodiment, the on-duties (Daon and Dbon) of the respective switching elements 5a and 5b are generated by correcting the reference on-duty (duty) according to the ratio between the inductance values La and Lb of the respective reactors 4a and 4b. Therefore, even in the operation region of the continuous mode, unbalance of the change amounts of the bus-bar currents (Idc) in the respective on-periods of the switching elements 5a and 5b can be suppressed.

Therefore, for example, it is also possible to configure that, when there are errors in the reactor currents (ILa and ILb) flowing into the respective reactors 4a and 4b, in the discontinuous mode and the critical mode in which these errors are not accumulated, the on-duty correction described above is not performed, and the on-duty correction is performed only in the operation region of the continuous mode. With this configuration, the calculation load of a microcomputer can be decreased without degrading suppressing effects of a harmonic current due to the on-duty correction.

Furthermore, it is also possible to configure that, even in the operation region of the continuous mode, instead of performing the on-duty correction each time the respective switching elements 5a and 5b are switched, for example, the on-duty correction is performed with respect to the drive pulses of the respective switching elements 5a and 5b at least once in switching operations of the respective switching elements 5a and 5b during one cycle of an alternating-current power supply, or at least once in the switching operations of the respective switching elements 5a and 5b in the operation region of the continuous mode, and when any correction on the respective on-duties is not performed, the reference on-duty (duty) is applied to the respective on-duties (Daon and Dbon), thereby decreasing the number of times of performing the on-duty correction. With this configuration, the calculation load of a microcomputer can be further decreased, so that the switching control unit 10 can be constituted by a microcomputer or the like, which has a lower computation processing performance and is manufactured at a lower cost.

Figure 10:
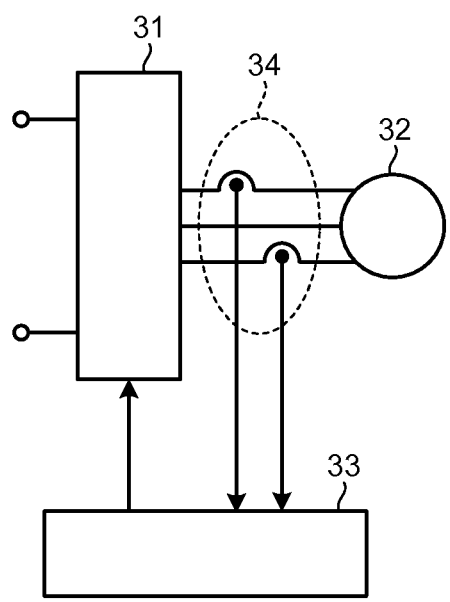
FIG. 10 is a diagram showing an example of a load of the power conversion device according to the first embodiment.

FIG. 10 is a diagram showing an example of a load of the power conversion device according to the first embodiment. In the example shown in FIG. 10, as the load of the power conversion device according to the first embodiment, a load in which an inverter 31 that converts a direct-current voltage into an alternating-current voltage and a motor 32 that is driven by application of an alternating-current voltage, which is output of the inverter 31 are connected to each other.

The inverter 31 is formed by having switching elements such as an IGBT constituted in a three-phase bridge configuration or a two-phase bridge configuration. An inverter control unit 33 that controls the inverter 31 computes a voltage command indicating that the motor 32 to be rotated at a desired rotation number, by using, for example, a motor-current detection unit 34 that detects a current flowing from the inverter 31 to the motor 32, and generates a pulse that drives switching elements in the inverter 31.

Furthermore, in the configuration shown in FIG. 10, similarly to the switching control unit 10, it suffices that inverter control executed by the inverter control unit 33 is realized by using a computation unit such as a microcomputer.

In the power conversion device according to the first embodiment, in a motor drive control apparatus that is configured to be connected to the load shown in FIG. 10, there is a characteristic that a required bus-bar voltage (Vo) is different according to the power load to the power conversion device.

Generally, while it becomes necessary to increase the output voltage from the inverter 31 as the rotation number of the motor 32 becomes higher, the upper limit of the output voltage from the inverter 31 is regulated by an input voltage to the inverter 31, that is, the bus-bar voltage (Vo) as output of the power conversion device. A region where the output voltage from the inverter 31 exceeds the upper limit that is regulated by the bus-bar voltage (Vo) and the output voltage is saturated is referred to as "overmodulation region".

In this type of motor drive control apparatus, in a range in which the motor 32 is rotated at a low speed (that is, an output voltage does not reach the overmodulation region), it is not necessary to boost the bus-bar voltage (Vo), and when the motor is rotated at a high speed, the overmodulation region can be shifted to a high rotation speed side by boosting the bus-bar voltage (Vo). With this configuration, the operation range in the motor 32 can be expanded to the high rotation speed side.

Furthermore, if it is not necessary to expand the operation range in the motor 32, the winding degree of stator winding of the motor 32 can be increased for the size of the saved range. In this case, in the region of a low rotation speed, the current in the region becomes less for the amount of the increase of the motor voltage, and thus reduction of losses in the inverter 31 can be expected. In order to obtain effects of both expansion of the operation range in the motor 32 and loss minimization in the region of a low rotation speed, the winding degree of the motor 32 can be designed to an appropriate degree.

In the power conversion device according to the present embodiment, when the power load to the power conversion device is small and the required bus-bar voltage (Vo) is small, it suffices to operate the power conversion device in the discontinuous mode or the critical mode described above, and when the power load of the power conversion device is large and the required bus-bar voltage (Vo) is large, it suffices to operate the power conversion device in the continuous mode. At this time, by applying a configuration in which, in the discontinuous mode or the critical mode, instead of performing the on-duty correction described above, the on-duty correction is performed only in the operation region of the continuous mode, or even in the operation region of the continuous mode, instead of performing the on-duty correction in each switching operation of the respective switching elements 5a and 5b, the number of times of performing the on-duty correction is decreased, the calculation load of software can be decreased. Therefore, for example, the motor drive control apparatus can be configured at a lower cost by, for example, configuring the switching control unit 10 and the inverter control unit 33 shown in FIG. 10 with one microcomputer.

Further, when a motor drive control apparatus having applied therefor the power conversion device according to the first embodiment described above is applied to an air conditioner, and is used for driving at least one of motors of these air blower or compressor, effects identical to those described above can be obtained.

In the on-duty correction method described above, on-duty correction is performed based on the ratio k between the inductance values La and Lb of the respective reactors 4a and 4b in the respective on-periods of the respective switching elements 5a and 5b, and the change amounts of the bus-bar current (Idc) in the respective on-periods of the respective switching elements 5a and 5b are controlled to be equal; however, there is a case where the change amounts of the respective reactor currents (ILaoff and ILboff) in the respective off-periods of the switching elements 5a and 5b do not become equal, and in this case, unbalance of the change amounts of the bus-bar current (Idc) in the respective on-periods of the respective switching elements 5a and 5b cannot be necessarily suppressed. Accordingly, in the operation region of the continuous mode, errors of the change amounts of the respective reactor currents (ILaff and ILboff) that are generated in the off-periods of the respective switching elements 5a and 5b and flow into the respective reactors 4a and 4b are accumulated. In this case, it suffices to control the respective switching elements 5a and 5b such that respective reactor currents at the time of ending the off-periods of the switching elements 5a and 5b, that is, at the on-timings of the switching elements 5a and 5b, become equal.

Each of the reactor currents at the time of ending the off-periods of the respective switching elements 5a and 5b can be expressed by the following equations (10) and (11). The value after ending the off-period is calculated by the following equations. In these equations, n denotes, with a zero-crossing point of a power-supply voltage as an origin, one cycle (a half switching cycle of the respective switching elements 5a and 5b) of a ripple component of nth bus-bar current. Therefore, ILb0(n) denotes a value of a current flowing into the reactor 4b after ending the off-period during one cycle of the ripple component of nth bus-bar current (Idc), and Idc(n) denotes a bus-bar current detection value during one cycle of a ripple component of nth bus-bar current (Idc), and ILa0(n−1) denotes a value of a current flowing into the reactor 4a after ending the off-period during one cycle of a ripple component of n−1th bus-bar current (Idc).

$$ILb0(n)=Idc(n)-ILa0(n-1)-\Delta ILaon*Daon*Tsw/2+\Delta ILboff*(1-Daon)*Tsw/2 \quad (10)$$

$$ILa0(n+1)=Idc(n+1)-ILb0(n)-\Delta ILbon*Dbon*Tsw/2+\Delta ILaoff*(1-Dbon)*Tsw/2 \quad (11)$$

In the equations (10) and (11) described above, ILb0(n) denotes a reactor current flowing into the reactor 4b at the time of ending the off-period of the switching element 5b in nth cycle in a cycle of a ripple component (a half switching cycle Tsw of the respective switching elements 5a and 5b) having a zero-crossing point of a power-supply voltage as an origin, Idc(n) denotes a detection value of a bus-bar current at the time of ending the off-period of the switching element 5b in nth cycle of a ripple component, ILa0(n−1) denotes a reactor current flowing into the reactor 4a at the time of ending the off-period of the switching element 5a in (n−1)th cycle of a ripple component, ILa0(n+1) denotes a reactor current flowing into the reactor 4a at the time of ending the off-period of the switching element 5a in (n+1)th cycle of a ripple component, and Idc(n+1) denotes a detection value of a bus-bar current at the time of ending the off-period of the switching element 5a in (n+1)th cycle of a ripple component.

By controlling the respective reactor currents at the time of ending the off-periods of the respective switching elements 5a and 5b to be equal by using the equations (10) and (11) described above, it becomes possible to also control the change amounts of the respective reactor currents (ILaoff and ILboff) flowing into the reactors 4a and 4b in the off-periods of the respective switching elements 5a and 5b to be equal.

As explained above, according to the power conversion device of the first embodiment, in a configuration including a plurality of chopper circuits, by using a fact that a bus-bar current in a section in which respective on-periods of respective switching elements do not overlap on each other is equal to an aggregate current of a reactor current flowing into one of reactors in the off-period of one of the switching elements and a reactor current flowing into the other reactor in the off-period of the other switching elements, a ratio between inductance values of the respective reactors calculated by using respective change ratios per unit time of the bus-bar current in this case is designated as a ratio between on-duties of the respective switching elements, thereby controlling the change amounts of bus-bar currents in the respective on-periods of the respective switching elements to be equal. Therefore, suppressing effects of a harmonic current can be improved with a simpler configuration and regardless of the operation mode of the power conversion device.

Furthermore, by detecting a bus-bar current in a state where respective switching elements are individually switched on, calculating the ratio between respective inductance values of respective reactors of respective chopper circuits before operating the power conversion device, and performing on-duty correction by using the ratio between the respective inductance values calculated before operating the power conversion device, it becomes unnecessary to calculate the ratio between the respective inductance values when the power conversion device is in operation, and thus the calculation load of software can be decreased. Accordingly, the switching control unit can be constituted by a microcomputer or the like, which has a lower computation processing performance and is manufactured at a lower cost.

Further, effects of decreasing the calculation load of a microcomputer can be improved by decreasing the number of times of performing on-duty correction as, for example, in switching operations of the respective switching elements during one cycle of an alternating-current power supply, correction of respective on-duties is performed at least once, and a reference on-duty is applied to the respective on-duties in other switching operations.

Furthermore, by configuring the power conversion device such that, when there are errors in reactor currents flowing into the respective reactors, in the discontinuous mode or the critical mode in which these errors are not accumulated, on-duty correction is not performed and the on-duty correction is performed only in the operation region of the continuous mode, the calculation load of a microcomputer can be decreased without degrading suppressing effects of a harmonic current due to the on-duty correction.

Further, it is possible to configure the power conversion device such that, even in the operation region of the continuous mode, the on-duty correction is performed with respect to the drive pulses of the respective switching elements 5a and 5b at least once in switching operations of the respective switching elements 5a and 5b during one cycle of an alternating-current power supply, or at least once in the switching operations of the respective switching elements 5a and 5b in the operation region of the continuous mode, and in other switching operations, a reference on-duty is applied to the respective on-duties in other switching operations, so as to further decrease the number of times of performing on-duty correction, thereby further decreasing the calculation load of software. Accordingly, the switching control unit can be constituted by a microcomputer or the like, which has a lower computation processing performance and is manufactured at a lower cost.

Second Embodiment

Figure 11:
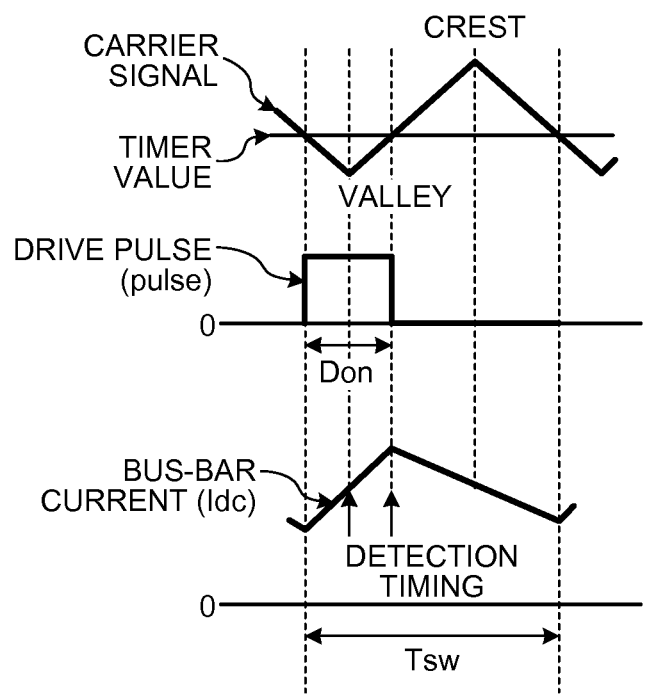
FIG. 11 is a diagram showing respective waveform charts of a carrier signal, a drive pulse, and a bus-bar current of the power conversion device according to a second embodiment.

A calculation method of slopes ($\Delta Idc(aonboff)$ and $\Delta Idc(aoffbon)$) of the bus-bar current (Idc) in a power conversion device according to a second embodiment of the present invention, that is, a calculation method of respective change ratios per unit time of the bus-bar current (Idc) in respective on-periods of respective drive pulses, is explained with reference to FIG. 11. FIG. 11 is a diagram showing respective waveform charts of a carrier signal, a drive pulse, and a bus-bar current of the power conversion device according to the second embodiment. Because configurations of the power conversion device according to the second embodiment are identical to those of the power conversion device according to the first embodiment, explanations thereof will be omitted.

In the first embodiment, there has been explained an example of calculating respective change ratios per unit time of the bus-bar current (Idc) in respective on-periods of respective drive pulses (hereinafter, "bus-bar current change ratio") by, when the bus-bar current (Idc) is imported as a digital value, connecting an output terminal of the bus-bar current detection unit 8 to at least two ports among A/D (Analog/Digital) conversion ports of a microcomputer, sampling the digital value with the time difference Tad that is sufficiently shorter than the on-period (Don) of the drive pulse (pulse) between the two A/D conversion ports, and dividing the difference value Idcad of the bus-bar current in the two A/D conversion ports by the time difference Tad.

In this case, sampling is performed by importing, by one of the A/D conversion ports, the bus-bar current (Idc) as a digital value at a timing where the bus-bar current (Idc) is synchronized with a trough or a crest of a carrier signal within a microcomputer, and after the time period Tad, sampling is performed again by importing, by the other A/D conversion port, the bus-bar current (Idc) as a digital value. In this calculation method, although the calculation load is light because the time difference Tad is a fixed value, when the time difference Tad is small, the change amount (Idcad shown in FIG. 8) of the bus-bar current (Idc) that is obtained as a calculation result is small, and thus the power conversion device is easily influenced by noise.

Furthermore, it is necessary to set in advance the time difference Tad to be equal to or less than ½ (Don/2) of the on-period (Don) of the drive pulse (pulse).

In the present embodiment, as shown in FIG. 11, sampling is performed at a timing where the bus-bar current (Idc) is synchronized with a trough of a carrier signal within a microcomputer, and then sampling is performed again at a timing where the drive pulse is switched from on to off. The bus-bar current change ratio is calculated by dividing a difference (corresponds to Idcad shown in FIG. 8) of the two pieces of sampling data obtained by the sampling operations by an on-period Don/2 of the drive pulse (pulse). By employing such a calculation method, because the change amount (Idcad shown in FIG. 8) of the bus-bar current (Idc) obtained as a calculation result with respect to the noise level becomes large, the power conversion device using this calculation method becomes less susceptible to noise influence than the power conversion device using the calculation method of the first embodiment. Further, because it becomes unnecessary to set in advance the time difference Tad that becomes equal to or less than ½ (Don/2) of the on-period (Don) of the drive pulse (pulse), the variable range in the on-period (Don) of the drive pulse (pulse) is not regulated by the time difference Tad, and thus the variable range in the on-period (Don) of the drive pulse (pulse) can be made wider.

While the example shown in FIG. 11 exemplifies a case where the first sampling is performed at a timing where the bus-bar current (Idc) is synchronized with a trough of a carrier signal within a microcomputer, it suffices that the bus-bar current change ratio of the switching element 5a is obtained by the calculation method described above, and the bus-bar current change ratio of the switching element 5b is calculated by performing the first sampling at a timing where the bus-bar current (Idc) is synchronized with a crest of the carrier signal of the microcomputer, and then sampling is performed again at a timing where the drive pulse (pulse) is switched from on to off and dividing a difference (corresponds to Idcad shown in FIG. 8) of the two pieces of sampling data obtained by the sampling operations by ½ (Don/2) of the on-period (Don) of the drive pulse (pulse).

As explained above, according to the power conversion device of the second embodiment, the bus-bar current change ratio is calculated by performing sampling at a timing where the bus-bar current (Idc) is synchronized with a trough or a crest of a carrier signal within a microcomputer, and then performing sampling again at a timing where the drive pulse (pulse) is switched from on to off and dividing a difference of the two pieces of sampling data obtained as a result of the two sampling operations by the on-period Don/2 of the drive pulse (pulse). Therefore, because the change amount of the bus-bar current (Idc) obtained as a calculation result with respect to the noise level becomes large, the power conversion device according to the second embodiment becomes less susceptible to noise influence than the power conversion device according to the first embodiment, and the S/N ratio of the bus-bar current change ratio is improved.

Furthermore, because it becomes unnecessary to set in advance the time difference Tad that becomes equal to or less than ½ (Don/2) of the on-period (Don) of the drive pulse (pulse), the variable range in the on-period (Don) of the drive pulse (pulse) is not regulated by the time difference Tad, and thus the variable range in the on-period (Don) of the drive pulse (pulse) can be made wider.

In the above embodiments, while there has been explained that, as an example, respective switching elements that configure respective chopper circuits are constituted by an IGBT, as the respective switching elements, it is preferable to apply a configuration in which a MOS-FET (Metal-Oxide-Semiconductor Field Effect Transistor) that is formed of a wide bandgap (hereinafter, "WBG") semiconductor, which is made of a material such as silicon carbide (SiC), a gallium nitride (GaN)-based material, or diamond, is used.

The MOS-FET formed of a WBG semiconductor has a smaller switching loss and a smaller conduction loss as compared to a MOS-FET formed of a Si (Silicon)-based semiconductor, has high heat resistance, and is capable of operating in a high temperature. Therefore, in a case where respective switching elements are formed of a WBG semiconductor, as compared to a case where the respective switching elements are formed of a Si-based semiconductor, heat-dissipation designing can be more simplified, such as reducing the size of a heat sink.

Further, such switching elements formed of a WBG semiconductor have a high voltage resistance characteristic and a high allowable current density, and thus downsizing of the switching elements themselves can be also made.

Therefore, by using switching elements formed of a WBG semiconductor as respective switching elements that configure respective chopper circuits, downsizing as well as cost reduction of the power conversion device can be achieved.

Meanwhile, in contrast to the fact that the steady loss of an IGBT is proportional to a current, the steady loss of a MOS-FET is proportional to square of a current, and thus loss increase of a MOS-FET at the time of occurrence of current unbalance is large. As explained in the first embodiment, by configuring the power conversion device such that the change amounts of bus-bar currents flowing into respective chopper circuits in respective on-periods of respective switching elements are controlled to be equal, suppressing effects of a harmonic current can be improved regardless of the operation mode of the power conversion device. Therefore, in a state where there is unbalance between bus-bar currents flowing into the respective chopper circuits, the loss in the configuration in which a MOS-FET is used for the respective switching elements becomes larger than the loss in the configuration in which an IGBT is used therefor.

That is, by employing a configuration in which a MOS-FET formed of a WBG semiconductor, which has a lower loss than a Si-based semiconductor, as respective switching elements constituting respective chopper circuits, much better effects can be achieved.

Further, when a motor drive control apparatus having applied therefor the power conversion device according to the embodiments described above is applied to an air conditioner, and is used for driving at least one of motors of these air blower or compressor, effects identical to those described above can be obtained.

The configuration described in the above embodiments is only an example of the configuration of the present invention. The configuration can be combined with other well-known techniques, and it is needless to mention that the present invention can be configured while modifying it without departing from the scope of the invention, such as omitting a part of the configuration.

INDUSTRIAL APPLICABILITY

As described above, the power conversion device according to the present invention is useful as a technique of improving suppressing effects of a harmonic current in a configuration including a plurality of chopper circuits, and is suitable for a motor drive control apparatus including the power conversion device, an air blower and a compressor including the motor drive control apparatus, and an air conditioner including the air blower or the compressor.

REFERENCE SIGNS LIST 1 alternating-current power supply (single-phase alternating-current power supply), 2 rectifier (single-phase rectifier), 2a to 2d rectifier diode, 3a, 3b chopper circuit, 4a, 4b reactor, 5a, 5b switching element, 6a, 6b backflow preventing element, 7 smoothing capacitor, 8 bus-bar current detection unit, 9 bus-bar voltage detection unit, 10 switching control unit, 11 rectified-voltage detection unit, 20 on-duty calculation unit, 21 bus-bar-current command-value control unit, 22 on-duty control unit, 23 on-duty correction unit, 24 drive-pulse generation unit, 31 inverter, 32 motor, 33 inverter control unit, 34 motor-current detection unit.

The invention claimed is:

1. A power conversion device comprising:
a plurality of chopper circuits connected in parallel, each chopper circuit including a reactor, a switching element, and a backflow prevention element;
a switching control unit that controls a plurality of switching elements;
a smoothing capacitor that smoothes outputs of the plurality of the chopper circuits;
a rectified-voltage detection unit that detects a rectified voltage output from the rectifier;
a bus-bar voltage detection unit that detects a bus-bar voltage smoothed by the smoothing capacitor; and
a bus-bar current detection unit that detects a bus-bar current to which a rector current flowing into the reactors is added,
wherein the switching control unit includes:
an on-duty calculation unit that calculates a reference on-duty of respective drive pulses with respect to the switching elements based on the bus-bar voltage and the bus-bar current;
an on-duty correction unit that calculates a ratio between inductance value of the respective reactors based on the rectified voltage, the bus-bar voltage and the slope of the bus-bar current, and corrects the reference on-duty based on the calculated ratio between the inductance values; and a drive-pulse generation unit that generates the respective drive pulses with respect to the plurality of switching elements based on the respective corrected on-duties.

2. The power conversion device according to claim 1, wherein the on-duty correction unit performs correction of the respective on-duties at least once in switching operations of the respective switching elements during one cycle of the alternating-current power supply, and when correction of the on-duties is not performed, the reference on-duty is applied to the respective on-duties.

3. The power conversion device according to claim 1, wherein, the on-duty correction unit performs correction of the on-duties in a continuous mode that is an operation state in which there is no period where the respective reactor currents become zero during one cycle of the respective drive pulses, and applies the reference on-duty to the respective on-duties in a discontinuous mode that is an operation state in which there is a period where the reactor currents become zero during one cycle of the respective drive pulses and in a critical mode that is an operation state in which respective switching elements are switched on at instant when respective reactor currents have become zero during off-periods of the respective switching elements.

4. The power conversion device according to claim 3, wherein the on-duty correction unit performs correction of the respective on-duties at least once in switching operations of the respective switching elements in the continuous mode, and when not performing correction of the on-duties, applies the reference on-duty to the respective on-duties.

5. The power conversion device according to claim 1, wherein, during each of on-periods of the respective drive pulses, the on-duty correction unit calculates a difference between the bus-bar currents in at least two different times that are separated by a predetermined time difference, and calculates respective change ratios per unit time of the bus-bar current.

6. The power conversion device according to claim 5, wherein the predetermined time difference is shorter than a period when the respective drive pulses are on.

7. The power conversion device according to claim 1, wherein the on-duty correction unit calculates a difference between the bus-bar current at a timing when the bus-bar current synchronizes with a trough or a crest of a carrier signal that generates the respective drive pulses and the bus-bar current at a timing when the drive pulses are switched from on to off, and calculates respective change ratios per unit time of the bus-bar current.

8. The power conversion device according to claim 1, wherein the on-duty correction unit differentiates the bus-bar current during each of on-periods of the respective drive pulses, and calculates respective change ratios per unit time of the bus-bar current.

9. The power conversion device according to claim 1, wherein, before the power conversion device is operated, the on-duty correction unit causes the respective switching elements only to be switched on, and calculates the respective slopes.

10. The power conversion device according to claim 1, wherein the respective switching elements are a MOS-FET formed of a wide bandgap semiconductor.

11. The power conversion device according to claim 10, wherein the wide bandgap semiconductor is silicon carbide, a gallium nitride-based material, or diamond.

12. A motor drive control apparatus comprising:
the power conversion device according to claim 1;
an inverter that converts a direct-current voltage as output of the power conversion device into an alternating-current voltage; and
a motor that is driven by the alternating-current voltage.

13. An air blower comprising the motor drive control apparatus according to claim 12.

14. A compressor comprising the motor drive control apparatus according to claim 12.

15. An air conditioner comprising the air blower according to claim 13.

16. An air conditioner comprising the compressor according to claim 14.

* * * * *